US009488988B2

(12) United States Patent
Ishigaki et al.

(10) Patent No.: US 9,488,988 B2
(45) Date of Patent: Nov. 8, 2016

(54) PUSH OPERATION MECHANISM HAVING TACTILE FEEDBACK

(71) Applicant: KABUSHIKI KAISHA TOKAI RIKA DENKI SEISAKUSHO, Aichi (JP)

(72) Inventors: Seiji Ishigaki, Aichi (JP); Konomu Abe, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 436 days.

(21) Appl. No.: 14/175,260

(22) Filed: Feb. 7, 2014

(65) Prior Publication Data

US 2014/0244041 A1     Aug. 28, 2014

(30) Foreign Application Priority Data

Feb. 26, 2013   (JP) .................................. 2013-035595

(51) Int. Cl.
    *G05B 11/01*    (2006.01)
    *G05D 3/12*     (2006.01)
    *G06F 3/01*     (2006.01)

(52) U.S. Cl.
    CPC ................. *G05D 3/12* (2013.01); *G06F 3/016* (2013.01)

(58) Field of Classification Search
    None
    See application file for complete search history.

(56) References Cited

U.S. PATENT DOCUMENTS

| 2002/0021277 | A1* | 2/2002 | Kramer | G06F 3/016 345/156 |
| 2003/0057934 | A1* | 3/2003 | Tierling | H03C 1/36 324/76.12 |
| 2009/0046054 | A1* | 2/2009 | Olien | G05G 1/10 345/156 |
| 2010/0328053 | A1* | 12/2010 | Yeh | G06F 3/041 340/407.2 |

FOREIGN PATENT DOCUMENTS

JP    2010-204741    9/2010

* cited by examiner

*Primary Examiner* — Wissam Rashid
(74) *Attorney, Agent, or Firm* — Roberts Mlotkowski Safran Cole & Calderon, PC

(57) ABSTRACT

An operating device includes a push operation mechanism that allows a push operation of an operation unit, a tactile feeling presenting unit including a drive transmission mechanism for presenting an operational feeling by driving the operation unit via the push operation mechanism, a detection unit that detects a motion of the operation unit, and a drive control unit that intermittently drives the operation unit by a drive control signal that is generated based on an activation pulse signal and an advance vibration pulse signal that includes a prescribed number of pulses and a voltage smaller than that of the activation pulse signal.

9 Claims, 7 Drawing Sheets

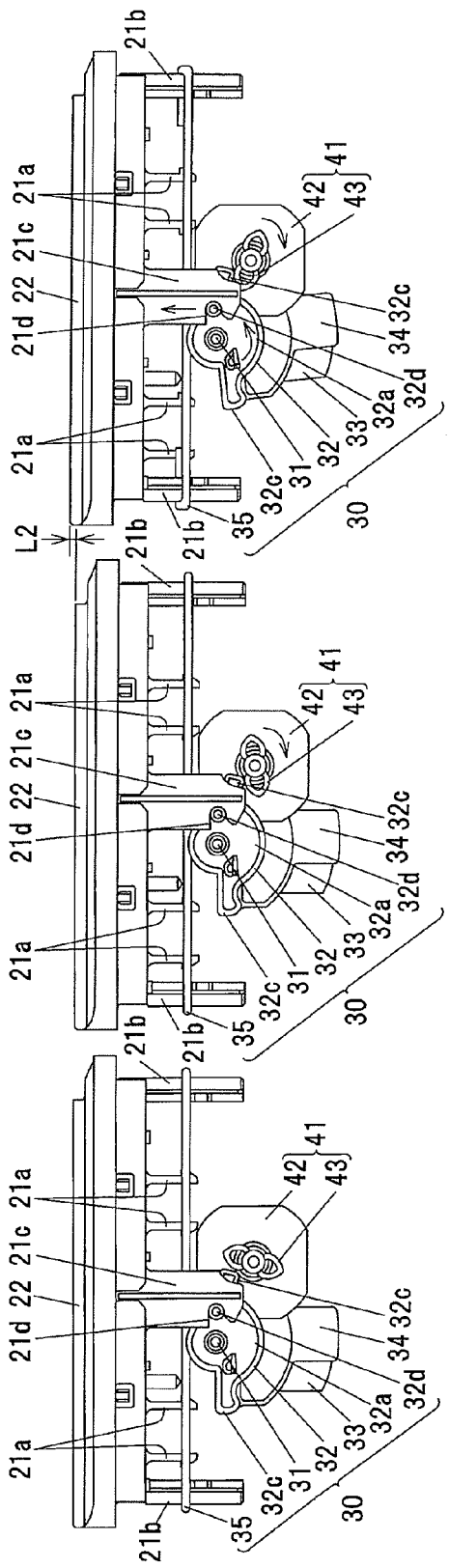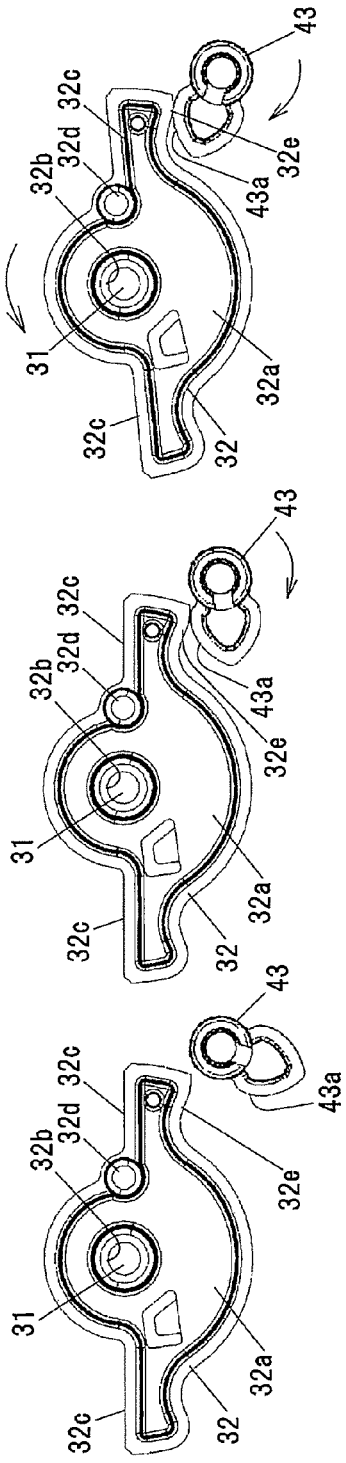

PUSH OPERATION MECHANISM HAVING TACTILE FEEDBACK

The present application is based on Japanese patent application No. 2013-035595 filed on Feb. 26, 2013, the entire contents of which are incorporated herein by reference.

BACKGROUND OF THE INVENTION

1. Field of the Invention

The invention relates to an operating device and, in particular, to an operating device that functions to present an operational feeling to an operator.

2. Description of the Related Art

As an example of a conventional information presentation device for providing information to an operator, a direction indicating device has been proposed that indicates a direction by using, e.g., a tilt of a finger of the operator (see, e.g., JP-A-2010-204741).

The direction indicating device disclosed in JP-A-2010-204741 is configured such that a finger placing plate arranged on the upper surface of plural movable panels which are independently vertically movable is inclined corresponding to the traveling direction displayed on a screen of a car navigation device. For example, a drive portion for driving the movable panels is composed of a rack protruding downward from the movable panels and a pinion fixed to an output shaft of a stepper motor.

SUMMARY OF THE INVENTION

The conventional information presentation device may raise a problem that an operational feeling thereof may be reduced by an operational resistance such as the cogging of the motor when the movable panel is operated by the motor driving system with the rack and the pinion as described above. In solving the problem, it may be considered to use a mechanism to drive the movable panels by a cam instead of using a mechanism always to combine the movable panel side and the motor side by a gear. In the mechanism to drive the movable panels by the cam, a backlash or play therebetween may be eliminated by abutting the motor-side cam on the movable panels before the movable panels are driven by the motor for presenting vibrations. However, the cam-driven mechanism may raise a different problem that an impact noise or needless vibration etc. is likely to occur when the cam on the side the motor abuts on the movable panel.

It is an object of the invention to provide an operating device that reduces the impact noise, needless vibration etc. to be caused in or before presenting the vibrations.

(1) According to one embodiment of the invention, an operating device comprises:

a push operation mechanism that allows a push operation of an operation unit;

a tactile feeling presenting unit comprising a drive transmission mechanism for presenting an operational feeling by driving said operation unit via said push operation mechanism;

a detection unit that detects a motion of said operation unit; and a drive control unit that intermittently drives said operation unit by a drive control signal that is generated based on an activation pulse signal and an advance vibration pulse signal that comprises a prescribed number of pulses and a voltage smaller than that of said activation pulse signal.

In the above embodiment (1) of the invention, the following modifications and changes can be made.

(i) The drive control unit stops outputting an advance vibration pulse signal after said detection unit detects a motion of said operation unit.

(ii) The drive control unit intermittently drives said operation unit by outputting an additional pulse signal which is larger than said advance vibration pulse signal after outputting said advance vibration pulse signal if said detection unit doesn't detect a motion of said operation unit when the prescribed time elapses.

(iii) The drive control unit presents an operational feeling by a main vibration control to drive said operation unit by said drive transmission mechanism via said push operation mechanism after said detection unit detects a motion of said operation unit.

(iv) The advance vibration pulse signal is set as a pulse line the voltage value or the pulse width of which gradually increases.

(v) The activation pulse signal comprises a plus pulse a direction of which is equal to a direction of driving said operation unit and a minus pulse a polarity of which is opposite to that of said plus pulse.

(vi) The operation unit comprises a touch panel.

(vii) The drive transmission mechanism comprises a rotary drive means and a cam mechanism.

(viii) The push operation mechanism comprises a linking member supported by a body to which the operation unit is attached, and wherein said cam mechanism is configured to be rotatable between an engagement position to transmit a drive force of the rotary drive means to the linking member and a non-engagement position not to transmit the drive force of the rotary drive means to the linking member.

(ix) The cam mechanism is configured to convert a rotary motion of the rotary drive means into a reciprocating motion of the operation unit.

Effects of the Invention

According to one embodiment of the invention, an operating device can be provided that reduces the impact noise, needless vibrations etc. to be caused in or before presenting the vibrations.

BRIEF DESCRIPTION OF THE DRAWINGS

Next, the present invention will be explained in more detail in conjunction with appended drawings, wherein:

FIGS. 2A to 2C are explanatory diagrams illustrating an operation of the tactile display device during vibration feedback;

FIGS. 3A to 3C are diagrams corresponding to FIG. 4 showing an operation of components of the tactile display device;

DESCRIPTION OF THE PREFERRED EMBODIMENTS

Figure 1:
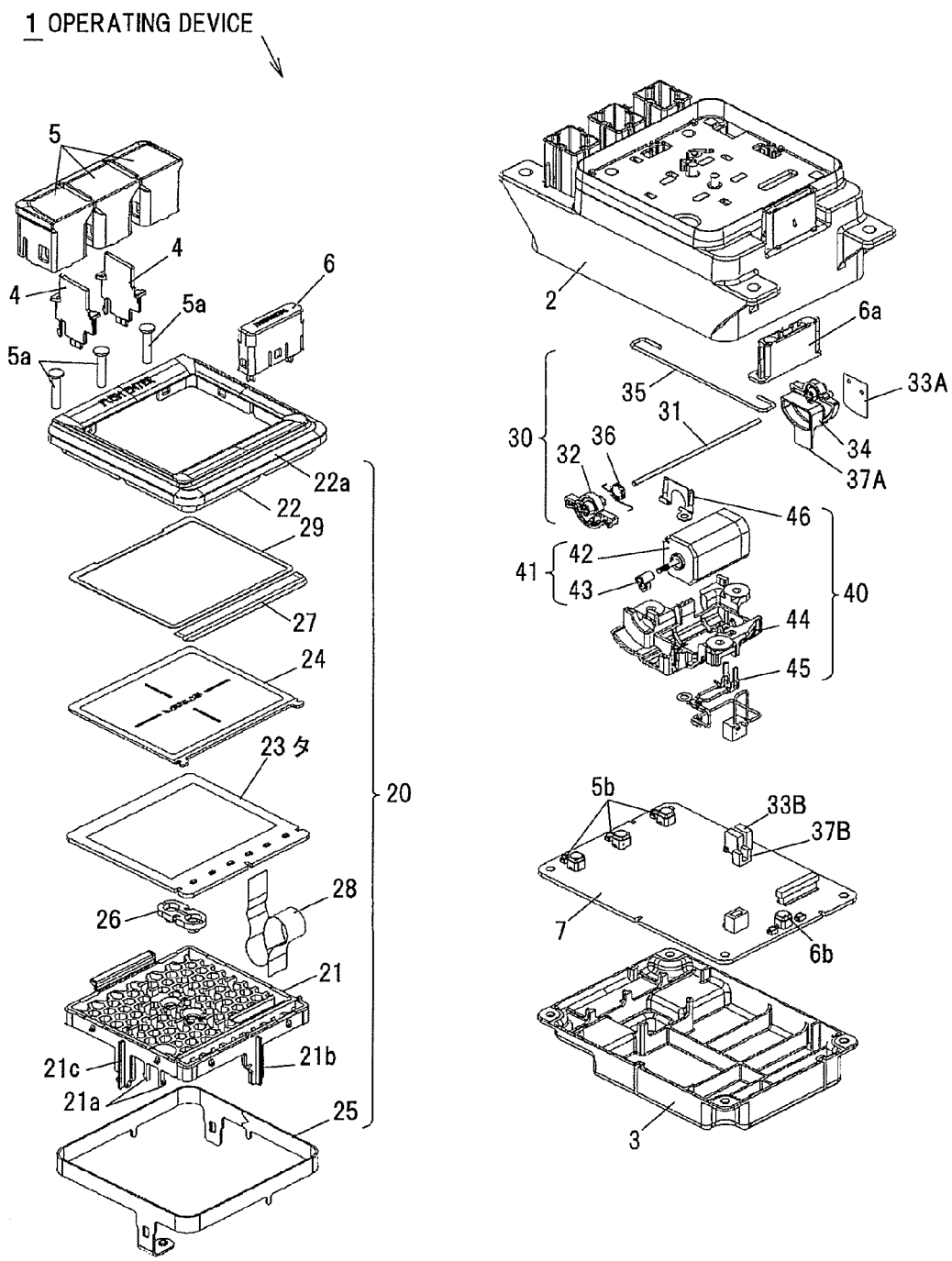
FIG. 1 is a schematic exploded perspective view showing a typical operating device provided with a tactile display device in an embodiment of the present invention.

A preferred embodiment of the invention will be specifically described below in conjunction with the appended drawings.

The First Embodiment of the Present Invention

Overall Structure of Operating Device 1

The operating device 1 schematically is formed of a push operation mechanism 30 which can push-operate a touch panel 24 as an operation unit, a tactile display device 40 as a tactile feeling presenting unit which presents an operational feeling by driving the touch panel 24 by driving a motor 42 as a drive unit via the push operation mechanism 30, a disc encoder 33 as a detection unit which detects a motion of the touch panel 24, and a drive control unit 100 which intermittently drives the motor 42 as a driving unit by a drive control signal Vc which is generated by an activation pulse signal $P_{01}$ and an advance vibration pulse signal $P_{02}$ which is composed of the prescribed number of pulses and is smaller than an activation pulse signal $P_{01}$.

In FIG. 1, a typical operating device provided with a tactile display device in the embodiment is indicated generally by the reference numeral 1 and components of the operating device are schematically shown as an example. The operating device 1 is not specifically limited but is suitably used as a vehicle touch panel which outputs operation signals for controlling operation of on-vehicle equipment such as an air-conditioning system, an audio system, a navigation system etc.

The operating device 1 in the illustrated example is arranged on a periphery of a driver's seat such as a center console (not shown) in a vehicle and is connected to a display (not shown) via a wiring.

The operating device 1 is configured as a remote control input device in which a touch operation of a touch panel by a finger of an operator causes, e.g., a touch sensor to detect a touch position on a surface of the touch panel and outputs a position detection signal corresponding to the detected position to select and determine an item button on a display.

As shown in FIG. 1, the operating device 1 is provided with a touch panel device 20 which can be push-operated and a tactile display device 40 which presents tactile stimuli-operational feeling (haptic feeling) to a finger of an operator when the touch panel device 20 is operated and receives an input.

The components of the touch panel device 20 and the tactile display device 40 are fitted into a resin body 2 formed in a case shape which opens downward, as shown in FIG. 1. A resin cover body 3 covering the lower opening of the body 2 is fastened and fixed by screws (not shown), thereby forming the operating device 1 in which the touch panel device 20 and the tactile display device 40 are integrated.

As shown in FIG. 1, three (first to third) operating knobs 5, 5, 5 are provided in line on one side of the body 2. Resin separators 4, 4 as insulations are interposed between adjacent operating knobs 5. A fourth operating knob 6 is provided on another side of the body 2. The first to fourth operating knobs 5 and 6 are arranged so that push switches 5b and 6b mounted on a control board 7 can be respectively turned on and off via pushers 5a and 6a.

Structure of Touch Panel Device 20

As shown in FIG. 1, the touch panel device 20 is assembled in a state that a rectangular touch sensor substrate 23 is attached to the sheet-shaped touch panel 24 by a double-sided tape (not shown) between a base 21 having a rectangular shape in a plan view and a frame 22 having a frame shape. The base 21 and the frame 22 are formed of a resin material. A rectangular frame-shaped sealing member 25 is arranged so as to cover an outer periphery of the touch panel device 20. The sealing member 25 is electrically connected to a ground circuit of the control board 7.

A recessed portion having a recessed shape is formed on an upper surface of the base 21 and the touch sensor substrate 23 is elastically held on a bottom surface of the recessed portion via a click member 26, as shown in FIG. 1. The click member 26 is formed of a cylindrical rubber material displaceable with respect to the touch panel 24 due to elastic deformation, and is formed so that an inner diameter on the touch panel 24 side is larger than that on the base 21 side.

The frame 22 is formed of a frame portion 22a providing an opening on the upper surface, as shown in FIG. 1. The frame portion 22a has a plate frame having a picture frame shape and a cylindrical wall portion extending from an edge of the inner periphery of the plate frame toward a housing portion.

As shown in FIG. 1, the touch sensor substrate 23 is connected to the touch panel 24 via a conductive tape 27 as an electrically conductive material.

As shown in FIG. 1, the touch sensor substrate 23 is, e.g., a capacitive touch sensor for detecting capacitance and is connected, via a flexible flat cable 28, to a connector (not shown) mounted on the control board 7. Meanwhile, the touch panel 24 is attached to the back side of the plate frame of the frame 22 by a double-sided tape 29 having sealing properties and is operably arranged such that an operation surface is exposed in an opening of the frame portion 22a of the frame 22.

Furthermore, as shown in FIG. 1, plural elastic engaging pieces 21a ... 21a to be engaged with through-holes formed on the body 2, a pair of guide pieces 21b, 21b guiding and moving along guide holes formed on the body 2 and a coupling piece 21c as a coupling member moving in conjunction with reciprocating motion of the touch panel 24 are formed on the base 21 so as to respectively extend toward a push operation mechanism 30.

Structure of Push Operation Mechanism 30

As shown in FIG. 1, the push operation mechanism 30 is provided with a support shaft 31 rotatably fixed to the body 2 and a linking member 32 which rotates integrally with one end of the support shaft 31. A disc encoder 33 as a location sensor for detecting a position of the push operation mechanism 30 and a holder 34 for holding the disc encoder 33 are fixed to another end of the support shaft 31.

Figure 4:
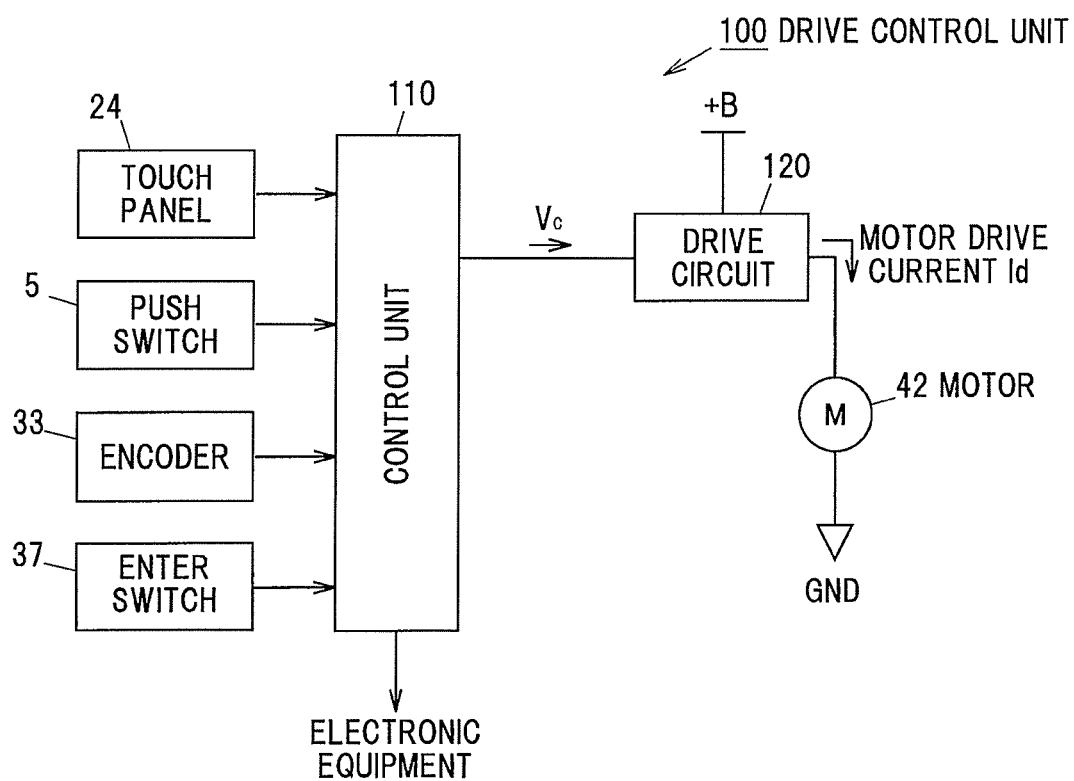
FIG. 4 is a block diagram showing an electrical system which mainly includes a drive control unit of an operating device in an embodiment of the present invention.

The disc encoder 33 is a rotary encoder which is formed of an encoder slit panel 33A fixed to the side of the push operating mechanism 30 and a photo-interrupter 33B fixed to the side of control board 7. The encoder slit panel 33A is fixed to the support shaft 31 and rotates according as the base 21 of the touch panel device 20 is vertically moved, so it can detect a motion of the touch panel 24, as a control unit fixed to the base 21, in high resolution. The detecting signal of the disc encoder 33 is input to a control unit 110, as shown in FIG. 4.

An enter switch 37 is formed of an enter switch plate 37A fixed to the side of the push operating mechanism 30 and a photo-interrupter 37B fixed to the side of control board 7. The enter switch 37 is fixed to a support shaft 31, so it can detect an enter-motion of the touch panel 24 as a control unit fixed to the base 21. The detecting signal of the enter switch 37 is input to the control unit 110, as shown in FIG. 4.

The push operation mechanism 30 is further provided with a stabilizer 35 for suppressing a tilting operation of the touch panel 24 during the push operation, as shown in FIG. 1. The stabilizer 35 is attached to the pair of guide pieces 21b of the touch panel device 20 at both ends respectively so as to cross with the support shaft 31, thereby suppressing the tilting operation around the support shaft 31.

A torsion spring 36 is attached to the linking member 32, as shown in FIG. 1. The torsion spring 36 is configured to constantly bias the linking member 32 in one direction. The support shaft 31 and the torsion spring 36 are formed of a metal material and the linking member 32 is formed of a resin material.

As shown in FIGS. 2A to 3C, the linking member 32 has a doughnut-shaped basal portion 32a having a support shaft-insertion hole 32b and a pair of arm portions 32c, 32c which are formed on both sides so as to protrude from an outer peripheral surface of the basal portion 32a. A coupling pin 32d protrudes from the basal portion 32a at an eccentric position.

The coupling pin 32d of the linking member 32 is coupled to the coupling piece 21c so as to be reciprocable (capable of reciprocating micro-motion) in a pin locking hole 21d formed on the coupling piece 21c of the base 21 of the touch panel device 20, as shown in FIGS. 2A to 3C. Due to the coupling between the coupling pin 32d and the coupling piece 21c, the linking member 32 rotates forward and backward around the support shaft 31 of the push operation mechanism 30 in conjunction with the push operation of the touch panel device 20. A portion of the coupling piece 21c opposite to the pin locking hole 21d is notched so as not to interfere with the tactile display device 40.

Structure of Tactile Display Device 40

The main basic structure of the operating device 1 in the present embodiment is the tactile display device 40 which is provided with a tactile display means for presenting an operational feeling by pushing a touch panel 24 as a control unit upward by driving the motor 42 as a driving unit and vibrating it. Therefore, the operating device 1 configured as described above is only a configuration example in the present embodiment, and shapes and structures of the components thereof are not limited to those of the illustrated example.

The tactile display device 40 is provided with a tactile display means for presenting tactile stimuli-operational feeling to a finger of an operator via the push operation mechanism 30. As shown in FIG. 1, the tactile display means is composed mainly of the linking member 32 of the push operation mechanism 30 and a drive transmission mechanism 41. The drive transmission mechanism 41 is provided with a rotary drive means and a cam mechanism.

As shown in FIG. 1, the motor 42 as the rotary drive means which can rotate forward and backward is held in a housing 44 which is fastened and fixed to the body 2 by screws (not shown). The motor 42 is electrically connected to the control board 7 via a terminal 45 having a cord electrically connected to the control board 7 and also via a ground clip 46 for discharging static electricity built up in the motor 42 to the ground circuit of the control board 7.

Meanwhile, as shown in FIG. 1, the cam mechanism is provided with a cam plate 43 as a rotating cam member which is fixed to an output shaft of the motor 42.

If the push operation mechanism 30 is continuously engaged with the tactile display device 40, the linking member 32 of the push operation mechanism 30 and the cam plate 43 of the tactile display device 40 will act as a resisting force against the push operation of the push operation mechanism 30 so as to impair the operation feeling thereof. Therefore, the continuous engagement is not preferred.

In the illustrated example, a structure to release the engagement between the linking member 32 and the cam plate 43 is provided. As shown in FIGS. 2A to 3C, the cam plate 43 is configured to be rotatable between an engagement position to transmit a drive force of the rotary drive means to the linking member 32 and a non-engagement position not to transmit a drive force of the rotary drive means to the linking member 32. When it is not necessary to generate a haptic feeling, the tactile display device 40 is stopped at a position away from the push operation mechanism 30.

As shown in FIGS. 2A to 3C, the cam plate 43 is a motion converting member which converts the rotary motion of the motor 42 into the reciprocating micro-motion of the touch panel device 20. On an outer surface of the cam plate 43, a cam surface 43a is formed so as to be symmetrical with respect to the output shaft of the motor 42. In the illustrated example, the cam surface 43a is formed to have an involute curve.

The cam surface 43a is configured to rotate at a predetermined angle while abutting at a cam follower surface 32e of the arm portion 32c on the cam plate-facing side, as shown in FIGS. 3B to 3C.

Structure of Drive Control Unit 100

FIG. 4 is a block diagram showing an electrical system which mainly includes a drive control unit of an operating device in an embodiment of the present invention. A drive control unit 100 is composed of the control unit 110, a drive circuit 120 etc. The motor 42 is rotationally driven by a motor drive current Id from the drive circuit 120 which is based on a drive control signal Vc output from the control unit 110. The drive control unit 100 intermittently drives the motor 42 by a drive control signal Vc which is generated by the activation pulse signal $P_{01}$ and the advance vibration pulse signal $P_{02}$ which is composed of the prescribed number of pulses and the voltage of which is smaller than that of the activation pulse signal $P_{01}$, until the cam surface 43a abuts on the cam follower surface 32e. In other words, the drive of the drive control unit 100 by a drive control signal Vc which is generated based on the activation pulse signal $P_{01}$ and the advance vibration pulse signal $P_{02}$ is a motion for eliminating the clearance (i.e., backlash or play) between the cam surface 43a and the cam follower surface 32e till the main-vibration starts by pushing the touch panel 24 upward, as FIG. 3A and FIG. 3B show that the cam surface 43a moves from the state shown in FIG. 3A to the state shown in FIG. 3B.

As shown in FIG. 4A, inputted to the control unit 110 are the coordinate data, the push data, and the angle data by the touch panel 24, push switches 5b and 6b, the encoder 33, and the enter switch 37, electrically controls the motor 42 based on these information and the information memorized in advance, and executes the motion for eliminating the backlash by a drive control signal Vc ($P_{01}$, $P_{02}$). After executing the motion for eliminating the backlash, the control unit 110 executes a main-vibration control to push the touch panel 24 upward in the state that the cam surface 43a abuts the cam follower surface 32e. Moreover, the control unit 110 outputs the control data from the touch panel 24 and the push switches 5b and 6b to electronic equipment and operates the electronic equipment by remote control.

The control unit 110 provides with, for example, CPU (Central Processing Unit) which gives arithmetic processing to the data obtained according to a memorial program, RAM (Random Access Memory) and ROM (Read Only Memory) which are semiconductor memories and so on. Furthermore, the control unit 110 provides with an analog signal output unit which outputs a drive control signal Vc generated by changing a voltage value and a pulse width based on the setting.

Figure 5:
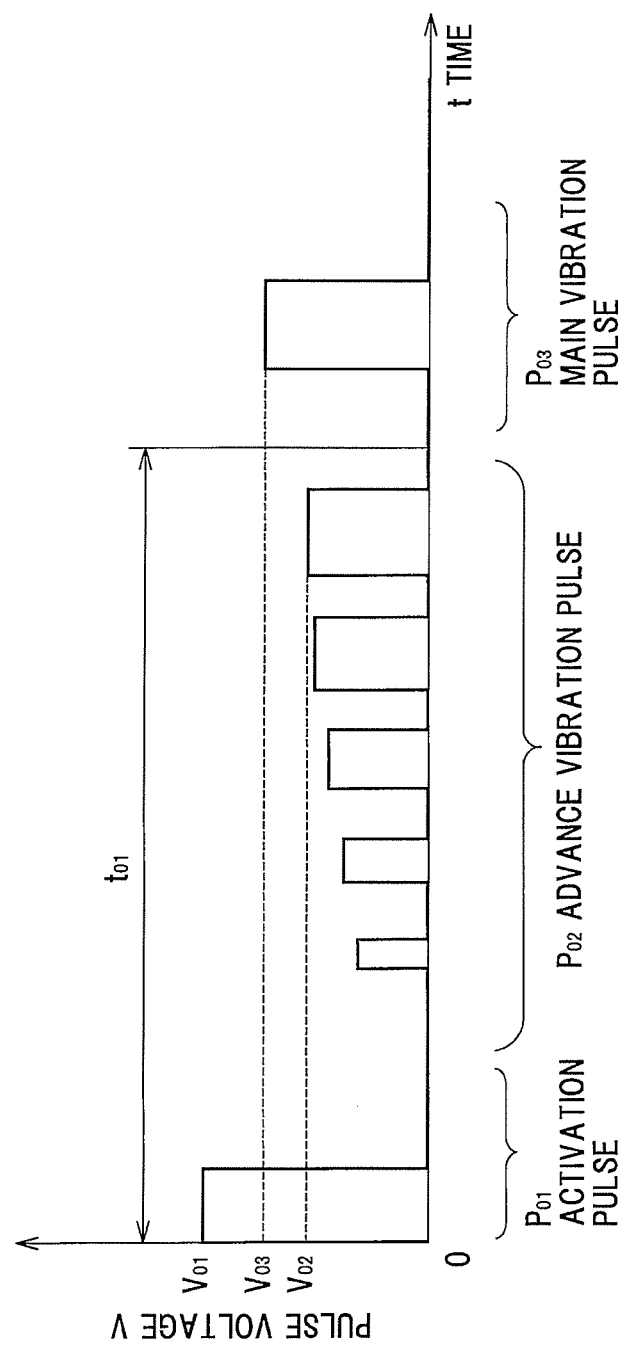
FIG. 5 is a diagram showing a drive control signal Vc in the first embodiment of the present invention.

FIG. 5 is a diagram showing the drive control signal Vc in the first embodiment of the present invention. The drive control signal Vc shown in FIG. 5 is generated as a pulse line by an activation pulse signal $P_{01}$ and an advance vibration pulse signal $P_{02}$ which is composed of the prescribed number of pulses and the voltage of which is smaller than that of an activation pulse signal $P_{01}$. The drive control signal Vc outputs a main vibration pulse $P_{03}$ after the motion for eliminating the backlash by the activation pulse signal $P_{01}$ and the advance vibration pulse signal $P_{02}$, and presents an operational feeling by the main vibration control to push the touch panel 24 upward.

The activation pulse signal $P_{01}$ is a pulse signal for activating the motor 42, and is set to a relatively high voltage value so as to shift in the condition influenced by the dynamic friction force from the condition influenced by the static friction force.

The advance vibration pulse signal $P_{02}$ is a pulse line which is composed of the prescribed number of pulses and the voltage value of which is set to $V_{02}$, which is smaller than the voltage value $V_{01}$ of the activation pulse signal $P_{01}$. In addition, the prescribed number of pulses is set to be enough in considering the range of operating temperature etc. so as to finish the motion for eliminating the backlash before the prescribed time $t_{01}$ elapses.

Moreover, the advance vibration pulse signal $P_{02}$ can be set as a pulse line the voltage value or the pulse width of which gradually increases as shown in FIG. 5. By setting in this way, the motion for eliminating the backlash can be ensured.

Figure 6:
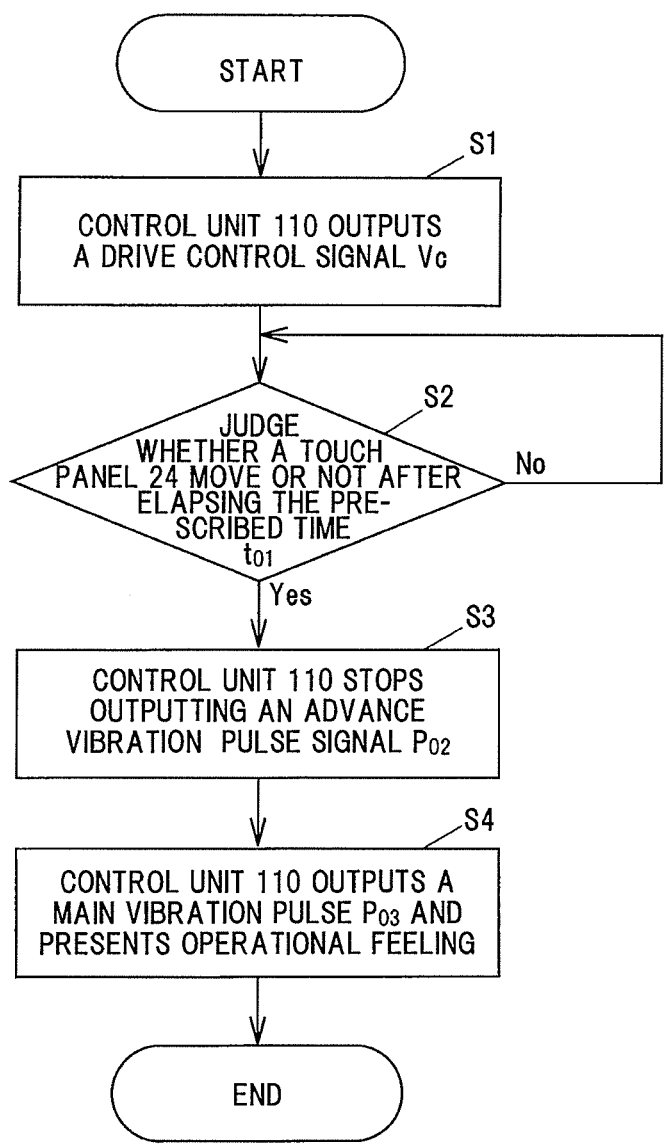
FIG. 6 is a flowchart showing a drive control unit of an operating device in the first embodiment of the present invention.

Embodiment of the Operation of Tactile Display Device by a Drive Control Signal Vc FIG. 6 is a flowchart showing the drive control unit of the operating device in the first embodiment of the present invention.

When a motion for presenting operational feeling starts, the control unit 110 outputs the drive control signal Vc, which is generated as a pulse line based on the activation pulse signal $P_{01}$ and the advance vibration pulse signal $P_{02}$ which is composed of the prescribed number of pulses and the voltage of which is smaller than that of the activation pulse signal $P_{01}$, to the drive circuit 120 (Step 01).

The control unit 110 detects a motion of the touch panel 24 after the elapse of the prescribed time $t_{01}$. This detection is practicable by a detection signal of the encoder 33 and judges whether the touch panel 24 as a control unit move or not. If it is judged that the touch panel 24 moves then go on Step 03, and if it is not judged that the touch panel 24 move then this judgment is repeated (Step 02).

The control unit 110 stops outputting the advance vibration pulse signal $P_{02}$ and finishes the motion for eliminating the backlash (Step 03).

The control unit 110 outputs the main vibration pulse $P_{03}$ as the drive control signal Vc and presents the operational feeling by the main vibration control to push the touch panel 24 upward (Step 04).

In accordance with the above steps, the presentation of the series of the operational feeling driven by the motor is completed.

Second Embodiment

In the second embodiment of the present invention, the overall structure of the operating device 1 is equal to that of the first embodiment of the present invention. On the other hand, a drive control signal Vc which is output from the control unit 110 is different from that of the first embodiment of the present invention, and the judgment step by the control unit 110 is also different from that of the first embodiment of the present invention. In the following description, only the differences are described and the descriptions on the overlapping parts with the first embodiment of the present invention are omitted.

Figure 7:
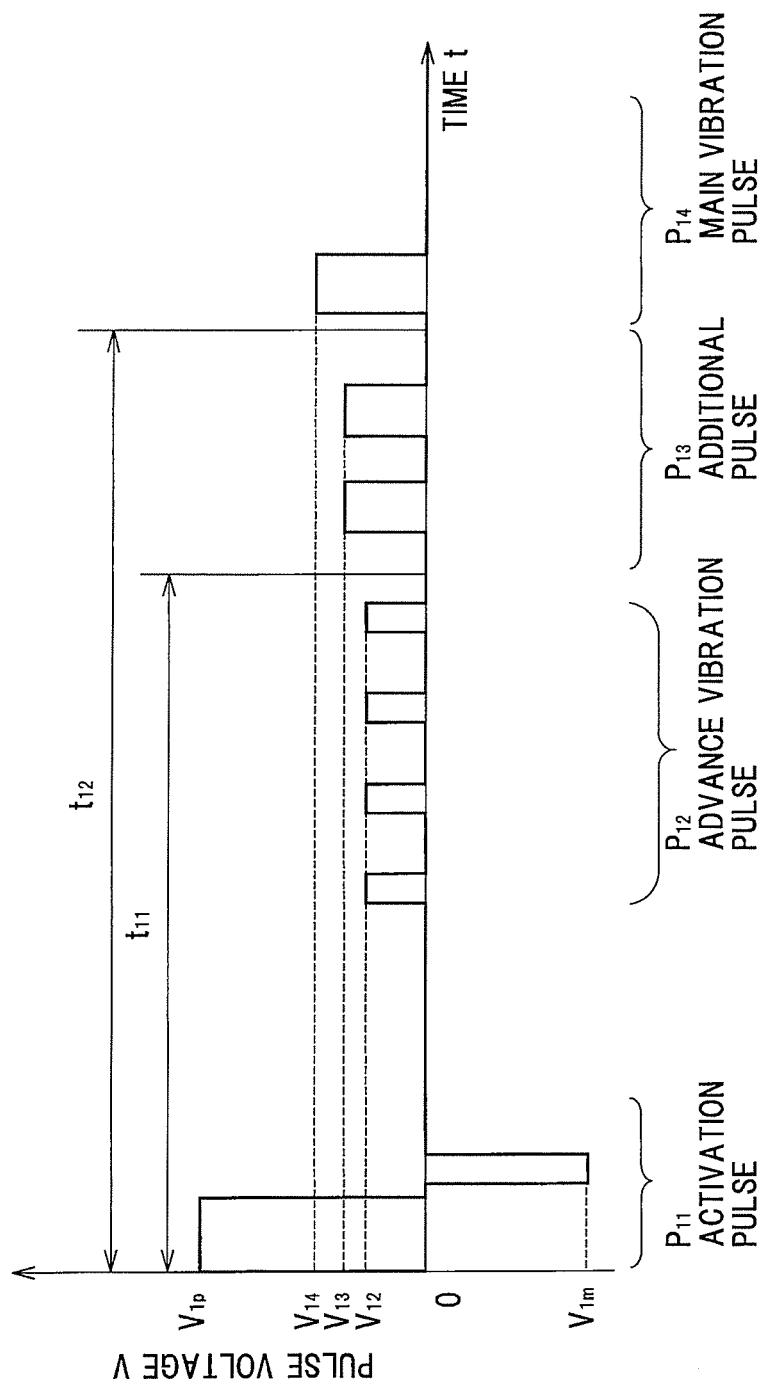
FIG. 7 is a diagram showing a drive control signal Vc in the second embodiment of the present invention.

FIG. 7 is a diagram showing a drive control signal Vc in the second embodiment of the present invention. The drive control signal Vc shown in FIG. 7 is generated as a pulse line based on an activation pulse signal $P_{11}$ and an advance vibration pulse signal $P_{12}$ which is composed of the prescribed number of pulses and the voltage of which is smaller than that of the activation pulse signal $P_{11}$. And if it is not judged that the touch panel 24 moves by the detection signal of the encoder 33 when the prescribed time $t_{01}$ elapses, then an additional pulse signal $P_{13}$, the voltage of which is set larger than that of an advance vibration pulse signal $P_{12}$, is output. Moreover, the drive control signal Vc outputs a main vibration pulse $P_{14}$ after the motion for eliminating the backlash by the activation pulse signal $P_{11}$, the advance vibration pulse signal $P_{12}$ and the additional pulse signal $P_{13}$ if needed, and presents the operational feeling by the main vibration control to push the touch panel 24 upward.

The activation pulse signal $P_{11}$ is a pulse signal for activating the motor 42, and is set to a relatively large voltage value so as to shift in the condition influenced by the dynamic friction force from the condition influenced by the static friction force. With regard to the activation pulse signal $P_{11}$, as shown in FIG. 7, a minus pulse voltage value $V_{1m}$ of an opposite polarity as a pulse signal for driving the motor 42 can be output after outputting the plus pulse (voltage value $V_{1p}$) in the direction of driving the motor 42. An excessive drive by the plus pulse (voltage value $V_{1p}$) can be revised by outputting the minus pulse voltage value $V_{1m}$.

The advance vibration pulse signal $P_{12}$ is a pulse line which is composed of the prescribed number of pulses and the voltage of which is set to the voltage value $V_{12}$ which is smaller than the voltage value $V_{ii}$ of the activation pulse signal $P_{11}$. In addition, the prescribed number of pulses is set by converting an equivalent amount of current so as to finish the motion for eliminating the backlash until prescribed time $t_{11}$ elapses.

In addition, the equivalent amount of current is set by simulating the motion of the cam based on an inertia moment, a torque generated by the motor 42 and so on, and searching the most suitable value of a current pattern which enable to minimize the impact speed of the cam by setting an evaluation function, a current value, an electricity time and so on, as design parameters. Since the prescribed pulse number is set by the equivalent amount of current, the motion for eliminating the backlash almost finishes when prescribed time $t_{11}$ elapses. But if the motion for eliminating the backlash doesn't finish, then the motion for eliminating the backlash completes by the additional pulse signal $P_{13}$.

As shown in FIG. 7, the voltage value $V_{13}$ of the additional pulse signal $P_{13}$ is set larger than the voltage value $V_{12}$ of the advance vibration pulse signal $P_{11}$, and is composed of one pulse or more than two pulses. The construction of the additional pulse signal $P_{13}$ enables to ensure the motion for eliminating the backlash even if the motion for eliminating the backlash doesn't finish when prescribed time $t_{11}$ elapses.

Figure 8:
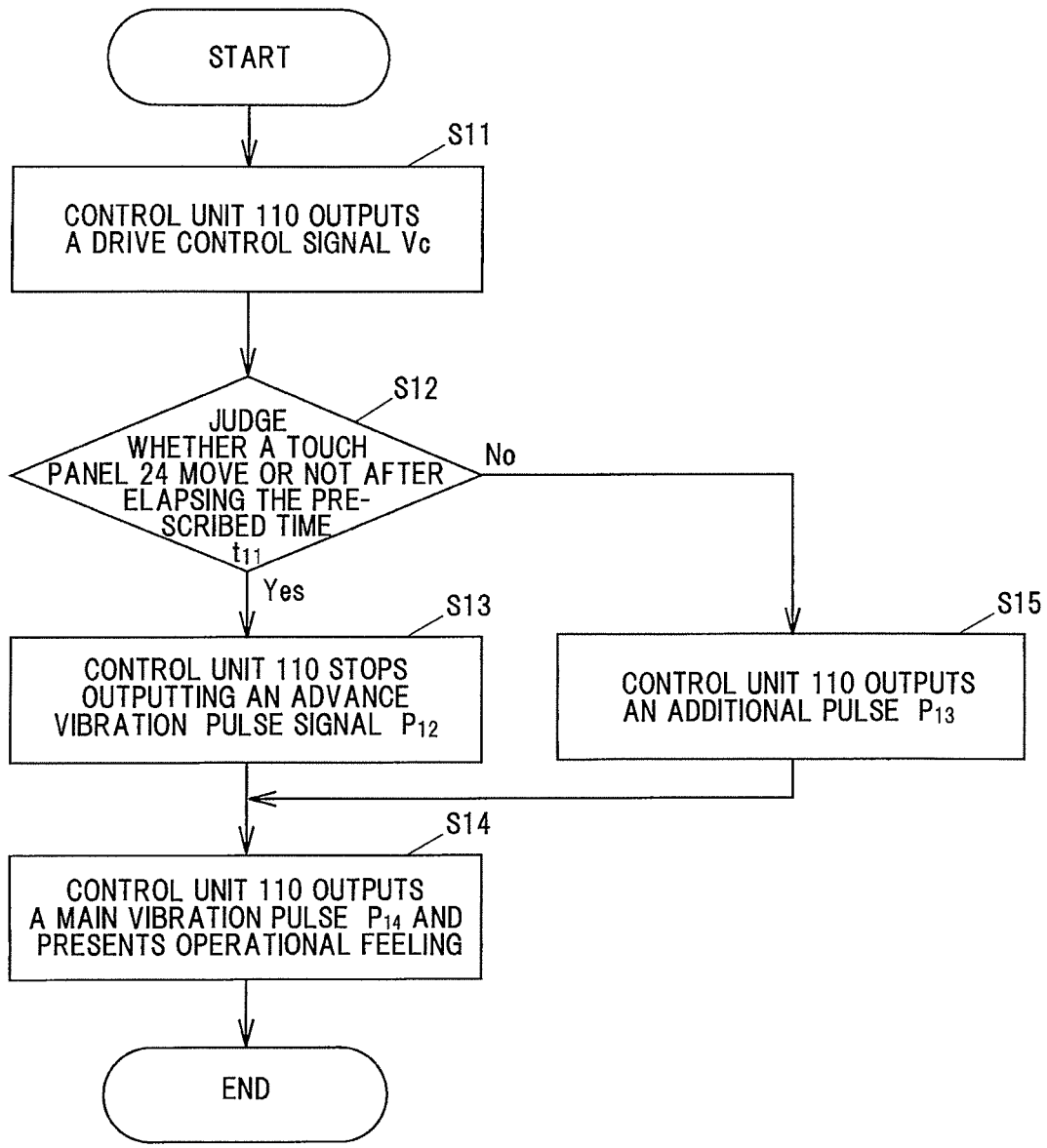
FIG. 8 is a flowchart showing a drive control unit of an operating device in the second embodiment of the present invention.

FIG. 8 is a flowchart showing the drive control unit of the operating device in the second embodiment of the present invention.

If a motion for presenting the operational feeling starts, then the control unit 110 outputs a drive control signal Vc, which is generated as a pulse line based on the activation pulse signal $P_{11}$ and the advance vibration pulse signal $P_{12}$ which is composed of the prescribed number of pulses and the voltage of which is smaller than that of the activation pulse signal $P_{11}$, to the drive circuit 120 (Step 11).

The control unit 110 detects a motion of the touch panel 24 after the prescribed time $t_{11}$ elapses. This detection is practicable by the detection signal of the encoder 33 and judges whether the touch panel 24 as the control unit moves or not. If judged that the touch panel 24 moves, then go on Step 13. If judged that the touch panel 24 does not move, then go on Step 15 (Step 12).

The control unit 110 stops outputting the advance vibration pulse signal $P_{12}$ and finishes the motion for eliminating the backlash (Step 13).

The control unit 110 outputs a main vibration pulse $P_{14}$ as the drive control signal Vc and executes the motion for presenting the operational feeling by the main vibration control to push the touch panel 24 upward (Step 14).

If it is not judged that the touch panel 24 move, then the control unit 110 outputs the additional pulse signal $P_{13}$ from the prescribed time $t_{11}$ to $t_{12}$ and executes the motion for eliminating the backlash. After outputting the additional pulse signal $P_{13}$ go on Step 14 (Step 15).

In accordance with the above steps, the presentation of the series of the operational feeling driven by the motor is completed.

Effects of the Embodiments

The operating device 1 in the embodiments of the present invention provides the following effects.
(1) In the embodiments of the present invention, the motion for eliminating the backlash between the cam surface 43a and the cam follower surface 32e is executed by the drive control signal Vc which is generated based on the activation pulse signal ($P_{01}$ or $P_{11}$) and the advance vibration pulse signal ($P_{02}$ or $P_{12}$). In executing the motion for eliminating the backlash, changes control method based on the judgment whether the touch panel 24 as a control unit moves or not after the prescribed time elapses. This control method enables to suppress impact noise, needless vibrations etc. in the motion for eliminating the backlash and enables to offer an operating device which enables to suppress the occurrences of impact noise, needless vibrations etc. in the motion for eliminating the backlash.

(2) The advance vibration pulse signal $P_{02}$ can be set as a pulse line the voltage value or the pulse width of which gradually increases. By setting in this way, the motion for eliminating the backlash can be ensured. In addition, this setting is applicable to the second embodiment of the present invention.
(3) With regard to the activation pulse signal $P_{11}$, an excessive drive can be revised by outputting a minus pulse voltage value $V_{1m}$, as shown in FIG. 7, the polarity of which is opposite to that of a plus pulse as a pulse signal for activating the motor 42 after outputting the plus pulse (voltage value $V_{1p}$) the direction of which is equal to that of driving the motor 42. In addition, this setting is applicable to the first embodiment of the present invention.
(4) The advance vibration pulse signal $P_{12}$ is a pulse line which is composed of the prescribed number of pulses and the voltage of which is set to the voltage value $V_{12}$ which is smaller than the voltage value $V_{1p}$ of the activation pulse signal $P_{11}$. Here, the prescribed pulse number o is set by converting the equivalent amount of current so as to finish the motion for eliminating the backlash until prescribed time $t_{11}$ elapses. The equivalent amount of current is set by simulating a motion of a cam based on an inertia moment, a torque generated by the motor 42 and so on, and searching the most suitable value of a current pattern which enable to minimize the impact speed of a cam by setting an evaluation function, a current value, an electricity time and so on, as design parameters. Since the prescribed pulse number is set by the equivalent amount of current, the motion for eliminating the backlash almost finishes when prescribed time $t_{11}$ elapses. And if the motion for eliminating the backlash doesn't finish, then it can be revised by an additional pulse signal $P_{13}$.
(5) The voltage value $V_{13}$ of the additional pulse signal $P_{13}$ is set larger than the voltage value $V_{12}$ of the advance vibration pulse signal $P_{12}$, and is composed of one pulse or more than two pulses. The construction of the additional pulse signal $P_{13}$ enables to ensure the motion for eliminating the backlash even if the motion doesn't finish when prescribed time $t_{11}$ elapses.

Modifications

In the operating device 1 of the invention, the following modifications can be also implemented.
(1) It is obvious that the above-mentioned tactile display means is applicable not only to the on-vehicle equipment but also to various terminal units, e.g. game consoles, personal computers, mobile phones etc.
(2) It is possible to present tactile stimuli-operational feeling to a finger of an operator even in various switching devices not provided with a touch panel and the above-mentioned tactile display means is also applicable to, e.g. mouse devices, keyboards, control knobs etc.
(3) The number, position and arrangement of the above-mentioned tactile display means can be appropriately selected depending on, e.g., the intended use etc., to achieve the initial object of the invention.

Although a typical embodiment, a modification and an illustrated example of the invention have been described, the invention according to claims is not to be limited to the embodiment, modification and illustrated example, as obvious from the above description. Therefore, it should be noted that all combinations of the features described in the embodiment, modification and illustrated example are not necessary to solve the problem of the invention.

What is claimed is:

1. An operating device, comprising:
a push operation mechanism that allows a push operation of an operation unit;
a tactile feeling presenting unit comprising a drive transmission mechanism for presenting an operational feeling by driving said operation unit via said push operation mechanism;
a detection unit that detects a motion of said operation unit; and
a drive control unit that intermittently drives said operation unit by a drive control signal that is generated based on an activation pulse signal and an advance vibration pulse signal that comprises a prescribed number of pulses and a voltage smaller than that of said activation pulse signal,
wherein said drive control unit intermittently drives said operation unit by outputting an additional pulse signal which is larger than said advance vibration pulse signal after outputting said advance vibration pulse signal if said detection unit does not detect a motion of said operation unit when the prescribed time elapses.

2. The operating device according to claim 1, wherein said drive control unit stops outputting an advance vibration pulse signal after said detection unit detects a motion of said operation unit.

3. The operating device according to claim 2, wherein said drive control unit presents an operational feeling by a main vibration control to drive said operation unit by said drive transmission mechanism via said push operation mechanism after said detection unit detects a motion of said operation unit.

4. The operating device according to claim 2, wherein said advance vibration pulse signal is set to be a pulse line whose voltage value or pulse width gradually increases.

5. The operating device according to claim 1, wherein said activation pulse signal comprises a plus pulse a direction of which is equal to a direction of driving said operation unit and a minus pulse a polarity of which is opposite to that of said plus pulse.

6. The operating device according to claim 1, wherein said operation unit comprises a touch panel.

7. The operating device according to claim 1, wherein said drive transmission mechanism comprises a rotary drive means and a cam mechanism.

8. The operating device according to claim 7,
wherein said push operation mechanism comprises a linking member supported by a body to which the operation unit is attached, and
wherein said cam mechanism is configured to be rotatable between an engagement position to transmit a drive force of the rotary drive means to the linking member and a non-engagement position not to transmit the drive force of the rotary drive means to the linking member.

9. The operating device according to claim 7, wherein said cam mechanism is configured to convert a rotary motion of the rotary drive means into a reciprocating motion of the operation unit.

* * * * *